July 27, 1965 E. W. HAWKINSON 3,196,491

TIRE RETREADING MATRIX

Original Filed Oct. 11, 1957

United States Patent Office 3,196,491
Patented July 27, 1965

3,196,491
TIRE RETREADING MATRIX
Earle W. Hawkinson, deceased, late of Minneapolis, Minn., by Francis W. Gaasedelen, administrator, Minneapolis, Minn., assignor to Paul E. Hawkinson Company, Minneapolis, Minn., a corporation of Minnesota
Continuation of application Ser. No. 689,641, Oct. 11, 1957. This application Oct. 5, 1962, Ser. No. 228,721
7 Claims. (Cl. 18—38)

This application is a continuation of co-pending application of the same title, Serial No. 689,641, filed October 11, 1957.

This invention relates to improvements in the manufacture and construction of truly circular cross-sectionally cylindrical light weight yet materially strengthened ring or band-type molds for the recapping of worn pneumatic tire casings.

The primary object of this invention is the provision of a device of the class above described which, by virtue of its construction is accurately formed in true round with increased rigidity.

A further and highly important object of this invention is the provision of a device of the class above described which is provided with radially outwardly projecting flanges at its marginal edges which not only uniformly reenforce and sustain the band circumferentially thereof but also provide true cylindrical mold shape and protection for the heating coils or other heating means secured to the outer peripheral surface of the mold and interposed therebetween.

Ring or band-type molds such as form the subject of the instant invention were pioneered and developed by Paul E. Hawkinson by his early Patents 1,917,261 and 1,917,262 for the curing and thus securing of a strip of tread rubber to the carcass of a tire casing between the shoulders of the tire, and at the rolling radius thereof. For the purpose stated it is essential that such molds be of light weight for manual handling and were formed wholly or in part from relatively light weight generally cylindrical sheet metal bands and that said bands were further formed by joining the abutting ends of an elongated strip of sheet metal, which had been bent by rolling to the desired arc. In addition to the foregoing it was the accepted practice in this art to form integral radially inwardly projecting continuous matrix and tread material confining flanges from the opposite side portions of the band, as shown in Hawkinson Patents 2,610,357, 2,662,245 and 2,813,304. While with such former practices for the purposes stated a truly circular band could not be produced, the art has not progressed to the degree where such became essential. Hence, on increase in demand for precision retreading equipment due to the greater speeds and relatively lower pressures inherent in improved pneumatic tire equipped vehicles, the need for a truly circular cross-sectionally cylindrical band-type mold increased in like proportion.

Further with the advent of molds of the type shown in Hawkinson Patent 2,748,423 wherein desired cast metal tread design forming matrix sections are to be secured within the sheet metal band, the need for a truly circular or round and cross-sectionally cylindrical band became even greater. Hence, as a result of constant experimentation in the solution of the numerous problems constantly presented by the rapid developments in the automobile and pneumatic tires, therefore it was finally found that only by outwardly turning the opposite side edge portions of the rolled sheet metal mold band and to produce uniform adequate flanges thereby it is possible to produce in production truly round cross-sectionally cylindrical intermediate mold bands which will have the lightness in weight required and the rigidity to build thereon in line production methods, the required industry finished tire retreading mold that is truly round and cylindrical from side to side thereof, circular in cross-section and reenforced rigid against deformation not only during assembly but particularly in the rigorous uses required of it during handling as well as the stresses and strains from extreme changing temperatures and pressure condition in the retreading industry.

To the above ends it became possible for the first time in this industry through the marked changes made in the construction of the mold band proper, whereby a rigid truly circular cross-sectionally cylindrical tire retreading matrix of the lightness and strength required, was created.

It is contended therefore that by the outwardly turned flange at each side edge of the sheet metal outer heat supplying mold member of this tire retreading matrix facilitates manufacture of the composite mold device and further makes it possible to construct the mold in a more truly circular form.

A further object of this invention is the provision of a device of the class described which is rugged in construction, accurate in dimensions, and which requires but a minimum of upkeep and repair.

The above and still further objects of this invention will become apparent from the following detailed specification, appended claims and attached drawings.

Referring to the drawings wherein like characters indicate like parts throughout the several views.

Figure 1:
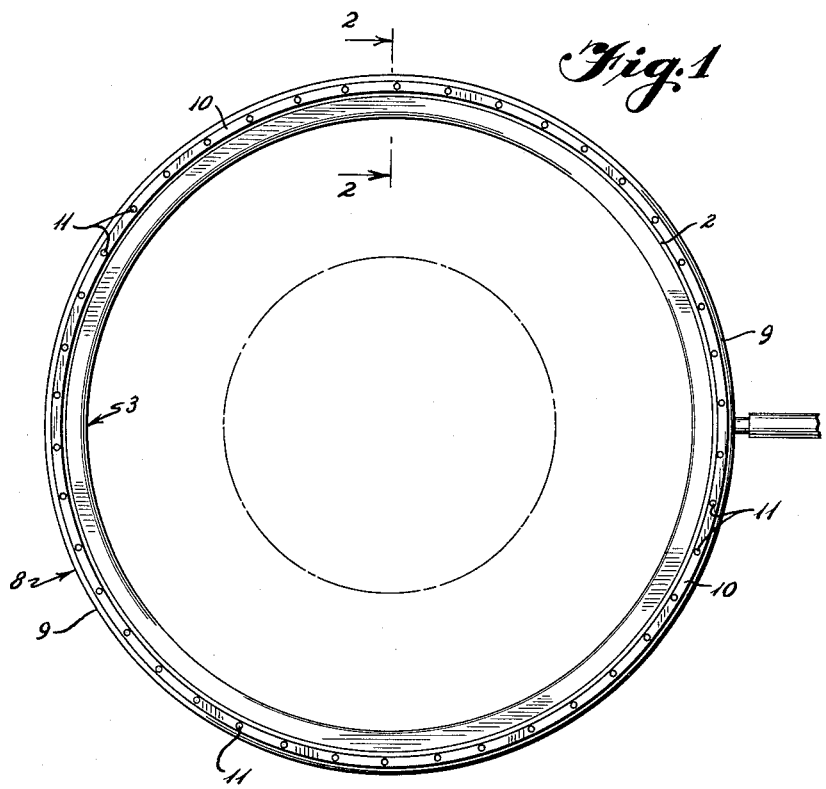
FIG. 1 is a view in side elevation of this novel structure.

Referring with greater particularly to the drawings, the numeral 1 indicates an unbroken, endless annular cylinder-like mold, preferably formed from sheet steel or the like, and having its opposite marginal edge portions bent radially outwardly to provide endless unbroken circumferentially extended parallel flanges 2. An annular matrix 3, preferably cast from aluminum or the like, with its outer peripheral surface of the same arcuate curvature as the truly circular mold is nestingly received within the mold 1 and is secured by any suitable means to the inner peripheral surface 4 thereof. It will be noted that the matrix 3 is of a width substantially conforming to the width of the mold 1. Uniform heat is imparted to the mold 1 and matrix 3 through the medium of tubular steam conduits 5 which, as shown, are soldered or otherwise secured to the outer peripheral surface 6 of the mold 1 and, as disclosed in the above identified United States Patents, is in the nature of a continuous tube wound spirally thereabout. It will be noted that the diameter of the heating tubes 5 is preferably less than the height of the flanges 2 so as to afford a maximum of protection to the tubes when the device is rested upon the floor or other supporting medium.

As is pointed out in the foregoing part of this specification it is of primary importance that a rigid and truly circular cross-sectionally cylindrical sheet metal ring or band-type mold be produced at the high rate of manufacture required to meet present demands. Prior to this invention, it must be borne in mind that in all prior attempts to produce such desired improvements in the device in question the sheet metal strip was either left flat for connection with the matrix or turned or folded inwardly, circumferentially of the mold. When the desired side flanges at the opposite sides of the mold were thus folded inwardly it became necessary to compact the extra metal of less diameter circumferentially adjacent opposite outer sides of the inner confined matrix.

Figure 2:
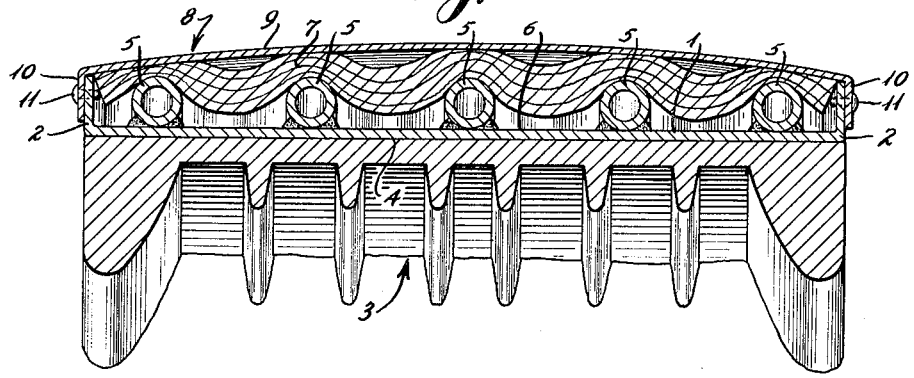
FIG. 2 is an enlarged sectional view taken on the line 2—2 of FIG. 1.

This operation did result in a strengthened structure as well as to confine tread material but one which was exceedingly difficult to produce in truly circular form because of unevenness which developed in compacting the extra metal of smaller diameter. On the essential change in matrix construction to cast metal sections instead of sheet metal such cast sections with their truly circular or arcuate outer surfaces could only be applied radially within the mold ring and between the side flanges for securing same to the inner periphery thereof. This operation developed hidden gaps where irregularities in true roundness in the opposed relatively rigid structures occurred resulting in non-uniform transfer of heat. However, as stated, it was at last found that greater rigidity and strength in production of a truly circular, transversely cylindrical sheet metal mold band may be had by turning the side edge portions of that mold band outwardly instead of crowding them inwardly. Further that such operations would also solve the important problem of uniform heat transfer between the mold and matrix to allow slidable engagement and thus speed up the accurate assembly of mold and matrix parts. After such important changes in mold construction it may be desirable in certain instances to enclose the outer mold structure as shown in section in FIG. 2.

Overlying the heating coil 5 and extending circumferentially thereabout as well as between the flanges 2 is an insulating batting 7, preferably of fiberglass or the like. Overlying the insulating batting 7 and completely housing the heating tubes 5 and the batting 7 is a cover member, identified in its entirety by the numeral 8, and comprising a generally cylindrical portion 9 spanning the flanges 2 and radially inwardly projecting anchoring flanges 10 which telescopically receive the flanges 2 of the mold 1 and are secured thereto at circumferentially spaced points through the medium of rivets or the like 11. As shown, the cover member 8 may be formed from considerably thinner sheet metal than the mold 1.

This invention has been thoroughly tested and found to be completely satisfactory for the accomplishment of the above objects and while a preferred embodiment thereof has been shown, it is to be understood that same it capable of modification without departure from the scope and spirit of the appended claims.

What is claimed is:

1. An endless rigid transversely cylindrical mold body formed of sheet metal and having its opposite side edges turned radially outwardly to provide therewith endless parallel continuous ringlike body sustaining flanges, said mold body having a truly cylindrical inner surface extending between the outer faces of said flanges and uniformly sustained thereby, heating means secured to the outer surface of said body intermediate said flanges and protected thereby, and a matrix having an arcuate outer surface corresponding in curvature with the sustained inner truly cylindrical surface of said mold body axially received therewithin over said corresponding cylindrical surface and secured thereto and flush with the outer faces of said ring-like flanges.

2. A recapping mold comprising an endless truly circular transversely cylindrical sheet metal mold body the opposite side edge portions of which are turned radially outwardly to provide endless parallel continuous ring-like flanges of uniform height for reenforcing and sustaining said mold body in rigid cylindrical form and with its inner surface extending to the outer faces of said ring-like flanges, heating means uniformly secured to the outer surface of said cylindrical body between the outwardly extending ring-like flanges thereof, and a matrix casting having an arcuate outer surface corresponding in curvature and width to that of the inner cylindrical surface of said mold band and slidably received therewithin and secured thereto flush with said outer faces of said ring-like flanges.

3. A recapping mold comprising an endless integral sheet metal body having a cylindrical intermediate portion and relatively rigid and radially outwardly projecting endless annular peripheral flange portions, the inner cylindrical surfaces of said mold body being continuous from the outer surface of one of said flange portions to the outer surface of said other flange portion and said peripheral flange portions being continuous and unbroken providing a reenforced truly cylindrical body of uniform high tensile strength from flange to flange thereof, a heating coil secured to the outer cylindrical surface of said mold body, a cylindrical cast metal matrix having at opposite sides thereof radially inwardly projecting annular flange portions, the outer cylindrical surface of said matrix coinciding with and frictionally engaging said cylindrical surface of said mold body and secured thereto, and the adjoining inwardly projecting annular flange portions of said matrix and the outwardly projecting annular flange portions of said mold body being in flush relation, whereby a rigid truly cylindrical and uniformly heated recapping mold is provided and maintained during reuse thereof.

4. In a re-capping mold, a cylindrical cast metal matrix having integral radially projecting tread material confining annular flanges defining the opposite marginal sides thereof, each of said flanges being solid and having inner walls flaring outwardly from an intermediate tread mold chamber, an endless one piece cylindrical sheet metal outer mold member surrounding said matrix and intimately connected thereto to form a rigid part thereof, said mold member having opposite endless annular side flanges extending radially outwardly as continuations of the marginal sides of said radially projecting tread material confining flanges of said matrix and defining therebetween a uniform matrix heating chamber and heating means secured to said outer mold member intermediate said flanges, said outer mold member having a cylindrical inner surface extending continuously between the outer faces of said flanges and uniformly sustained thereby.

5. The structure recited in claim 4 in which a blanket of insulating material overlays said heating coils between said flanges, and a blanket confining annular sheet metal cover member for said heating chamber having radially inwardly projecting annular flanges telescopically receiving and reenforcing the outwardly projecting side flanges of said mold member and rigidly secured thereto.

6. In a recapping mold, a cylindrical cast metal matrix having integral radially projecting tread material confining annular flanges defining the opposite marginal sides thereof, each of said flanges being solid and having inner walls flaring outwardly from an intermediate tread molding chamber, a one piece cylindrical sheet metal outer mold member surrounding said matrix and intimately connected thereto to form a rigid part thereof, said mold member having opposite annular side flanges extending radially outwardly as continuations of the marginal sides of said radially projecting tread material confining flanges of said matrix and defining therebetween a uniform matrix heating chamber, said outer mold member having a cylindrical inner surface extending continuously between the outer faces of said flanges, spaced heating coils secured to said outer mold member intermediate said flanges, a blanket of insulating material overlying said heating coils between said flanges, and a blanket confining annular sheet metal cover member for said heating chamber having radially inwardly projecting annular flanges telescopically received and reenforcing the outwardly projecting side flanges of said mold member and rigidly secured thereto.

7. An endless substantially rigid transversely cylindrical mold body having its opposite cylindrical side edges turned radially outwardly to provide therewith an endless parallel continuous ring-like body sustaining flanges, said mold body having a truly cylindrical inner surface extending between the outer faces of said flanges and uniformly sustained thereby, heating means secured to the outer surface of said body intermediate said flanges and protected thereby, and a matrix having an arcuate outer surface corresponding in width and curvature with the sustained inner truly cylindrical surface of said mold body axially received therewithin over said corresponding cylindrical surface and secured thereto with the side edges thereof extending flush with the outer faces of said ring-like flanges.

References Cited by the Examiner

UNITED STATES PATENTS

| | | | |
|---|---|---|---|
| 2,319,447 | 5/43 | Drennan | 18—18 |
| 2,644,984 | 7/53 | Crooker | 18—18 X |
| 2,659,933 | 11/53 | Hawkinson | 18—18 |
| 2,710,424 | 6/55 | Kraft et al. | 18—18 |
| 2,748,423 | 6/56 | Hawkinson | 18—18 |
| 2,830,321 | 4/58 | Hawkinson | 18—18 |
| 2,886,851 | 5/59 | Strickler et al. | 18—38 |
| 2,932,853 | 4/60 | Jike | 18—38 |
| 3,123,865 | 3/64 | Hawkinson | 18—38 |

FOREIGN PATENTS 420,829  12/34  Great Britain.

J. SPENCER OVERHOLSER, *Primary Examiner.*

MICHAEL V. BRINDISI, WILLIAM J. STEPHENSON,
*Examiners.*